United States Patent
Schmitz (10) Patent No.: US 11,141,891 B2
(45) Date of Patent: Oct. 12, 2021

(54) DEVICE AND METHOD FOR GENERATING A NEGATIVE PRESSURE IN A FILM MACHINE

(71) Applicant: Windmöller & Hölscher KG, Lengerich (DE)

(72) Inventor: Torsten Schmitz, Greven (DE)

(73) Assignee: Windmöller & Hölscher KG, Lengerich (DE)

(*) Notice: Subject to any disclaimer, the term of this patent is extended or adjusted under 35 U.S.C. 154(b) by 348 days.

(21) Appl. No.: 15/747,035

(22) PCT Filed: May 10, 2016

(86) PCT No.: PCT/EP2016/060451
§ 371 (c)(1),
(2) Date: Jan. 23, 2018

(87) PCT Pub. No.: WO2017/016693
PCT Pub. Date: Feb. 2, 2017

(65) Prior Publication Data
US 2019/0009439 A1 Jan. 10, 2019

(30) Foreign Application Priority Data

Jul. 24, 2015 (DE) .................... 10 2015 112 130.1
Sep. 11, 2015 (DE) .................... 10 2015 115 397.1

(51) Int. Cl.
*B29C 41/26* (2006.01)
*B29C 41/50* (2006.01)
(Continued)

(52) U.S. Cl.
CPC .............. *B29C 41/50* (2013.01); *B29C 41/26* (2013.01); *B29C 41/28* (2013.01); *B29C 41/52* (2013.01);
(Continued)

(58) Field of Classification Search
CPC ................................ B29C 41/26; B29C 41/50
See application file for complete search history.

(56) References Cited

U.S. PATENT DOCUMENTS

| 5,617,338 A * | 4/1997 | Sugano .............. B65G 47/917 340/626 |
| 5,618,568 A | 4/1997 | Krupa et al. |
| 2009/0218721 A1 | 9/2009 | Ochiai |

FOREIGN PATENT DOCUMENTS

| CN | 101137482 A | 3/2008 |
| EP | 1175987 A2 | 1/2002 |

(Continued)

OTHER PUBLICATIONS

Machine Translation of JP H10-272638 A, Oct. 13, 1998 (Year: 1998).*

(Continued)

*Primary Examiner* — Benjamin A Schiffman
(74) *Attorney, Agent, or Firm* — Rudy J. Ng; Bret E. Field; Bozicevic, Field & Francis LLP (57) ABSTRACT

The present invention relates to a device (10) for the generation of a negative pressure for stabilizing a melt strip (200) in the area of a transport device (120) of a film machine (100) particularly with a production process of a plastic film (230) comprising:
- at least one main chamber (20) for generating a first negative pressure in a first influence area (310)
- at least one auxiliary chamber (30) for generating a second negative pressure in a second influence area (320), wherein the first influence area (310) is assignable to at least one main area (210) of the melt strip (200) and the second influence area (320) is assignable to at least one edge area (220) of the melt strip (200) adjacent to the main area (210), and wherein the first negative pressure differs from the second negative pressure in order to effect a stabilization of the melt strip (200).

29 Claims, 5 Drawing Sheets

(51) Int. Cl.
  *B29C 41/28* (2006.01)
  *B29C 41/52* (2006.01)
  *B29C 48/88* (2019.01)
  *B29C 48/08* (2019.01)

(52) U.S. Cl.
  CPC ............ *B29C 48/08* (2019.02); *B29C 48/916* (2019.02); *B29C 48/917* (2019.02)

(56) References Cited

FOREIGN PATENT DOCUMENTS

| | | |
|---|---|---|
| GB | 1002450 A | 8/1965 |
| GB | 2029733 A | 3/1980 |
| JP | H06155494 A | 6/1994 |
| JP | H10272638 A | 10/1998 |
| JP | 2010179475 A | 8/2010 |
| WO | WO2006095792 A1 | 9/2006 |

OTHER PUBLICATIONS

Notification of the First Office Action for Chinese Patent Application No. 201680043092.9, issued by the China Intellectual Property Administration dated Jun. 24, 2019, and its English translation.
Notification of the Second Office Action for Chinese Patent Application No. 201680043092.9, issued by the China Intellectual Property Administration dated Apr. 16, 2020, and its English translation, 9 pages.
Examination Report for European Application No. 16722867.5 dated Jul. 28, 2020, with its English translation, 7 pages.
Decision of Rejection for Chinese Application No. 201680043092.9 dated Oct. 30, 2020, with its English translation, 14 pages.
Examination Report for German Application No. 102015115397.1 dated Mar. 24, 2021, with its English translation, 7 pages.

* cited by examiner

DEVICE AND METHOD FOR GENERATING A NEGATIVE PRESSURE IN A FILM MACHINE

The invention relates to a device for the generation of a negative pressure for the stabilization of a melt strip in the area of a transport device of a film machine, particularly with a production process of a plastic film. Further, the invention relates to a method for the production of a film, particularly a plastic film, wherein film material is led out from an outlet device in form of a melt strip through a transport device. The invention further relates to a film machine for the production of plastic film, particularly for a cast film unit.

From the state of the art it is known that for a production process of plastic film, particularly a stretch film in a cast film method, a device for generation of a negative pressure for the stabilization of a melt strip is used. This so called vacuum box is thereby arranged in the area of a transport device, particularly a cast roller, directly at an outlet device for a flowable film material (melt strip). Hereby, a negative pressure can be generated which determines how intensely the melt strip is sucked to the transport device. Further, the air introduced through the transport device due to the rotation movement is removed by the negative pressure. The negative pressure is for example generated by a blower, wherein the blower output or the intensity of negative pressure influences the stability of the melt strip and therewith the mechanic properties of the film. Thus, for example due to the reduction of the introduced amount of air the flexibility of the film can be influenced.

However, the negative pressure generated from the device can negatively affect the edge area of the film. Thus, a negative pressure which is optimally adjusted to the film properties can, however, deteriorate the stability and the properties of the edge. The edge area of the melt strip is normally separated from the film web due to the neck-in during the resulting film previous to the winding as a so called edge strip such that as a usable film area only the remaining main area (net area) serves. The edge area can for example fold over due to the optimized negative pressure for the middle main area of the film and lead to a rupture of the melt strip and therewith additionally minimize the usable area of the film. Further, disadvantages for the process speed and the stability of the production process can result. A reduction of these disadvantages is normally achieved by the introduction of an additional melt flow in the edges. This is, however, related to higher costs and enables only limited improved film properties.

Therefore, it is an object of the present invention to at least partially avoid the previously described disadvantages. Particularly, it is an object to improve and/or to improvingly or reliably control the process stability and the film properties which are influenced by the generation of negative pressure. Further, the properties of the edge area of the film should be optimized and the costs for the production should be decreased.

The previous object is solved by a device for the generation of a negative pressure with the features according to the present disclosure 1 and a method for the production of a film with the features according to the present disclosure and by a film machine with the features according to the present disclosure. Further features and details of the invention result from the respective depending claims, the description and the drawings. Thereby, features and details which are described in relation to the method according to the invention naturally also apply in relation to the device according to the invention and the film machine according to the invention and vice versa, such that according to the disclosure of the single aspects of the invention it can always be reciprocally related to.

The device according to the invention serves for the generation of a negative pressure for the stabilization of a melt strip in the area of a transport device of a film machine, particularly, with a production process of film, particularly a stretch film and/or plastic film, particularly, as a continuous material. The generation of a negative pressure effects particularly that a suction of the melt strip to the transport device occurs and the air introduced by the movement, particularly rotation, of the transport device is reduced. Preferably, the device according to the invention comprises at least one main chamber for the generation of a first negative pressure in a first influence area and at least one auxiliary chamber for the generation of a second negative pressure in a second influence area. Thereby, the first influence area can be assigned to at least one main area of the melt strip and/or the film and the second influence area to at least one edge area of the melt strip and/or the film adjacent to the main area, wherein the first negative pressure differs from the second negative pressure. Therewith, a stabilization of the melt strip can be effected. Further, the advantage results that the functionality of the process stability and the film properties can be decoupled from one another. The different (first and second) influence areas are therewith different functional areas. Normally, over the whole width of the melt strip an at least substantially same negative pressure is generated for the middle main area and the edge area. This has the effect that the process stability which is particularly determined by the properties and the stability of the film edge and the film properties, particularly the main area or net area, are coupled to one another and therewith cannot be optimized independent from one another. This is particularly a problem with films, particularly stretch films, which should be particularly thin or particularly high stretchable or particularly low stretchable. Particularly, thereby according to the invention a corresponding "decoupling" of the functionalities process stability and film properties occurs.

In order to further improve the process stability, particularly in the edge area in dependence of the process parameters, like a recipe, the edge thickness, the desired film thickness and/or an arrangement of the outlet device to the transport device or nozzle to the cast roller or suchlike the second negative pressure can be adjusted. For a thick edge of the film it has for example to be taken into account that a higher second negative pressure is generated in the second influence area by the auxiliary chamber. This enables a fast and effective cooling of the transport device. In contrast, a low second negative pressure is adjusted for a thin edge of the film in order to avoid a folding over of the edge.

In order to optimize the film properties particularly independent (decoupled) from the process stability preferably the first negative pressure in the first influence area meaning in the main area is adjusted particularly independent from the second negative pressure in the second influence area in dependence from the film property settings. Thereby, it is possible that a first main chamber and a second main chamber are provided particularly with first or second auxiliary chambers respectively, wherein the first negative pressure of the first and second main chamber is adjusted independently from the second negative pressure of the first and second auxiliary chamber. Preferably, the first negative pressure enables that the air amount is influenced which is introduced into the main area of the film or melt strip which directly determines the heat transmission coefficient between the melt and the transport device used for cooling off the melt. Particularly for very thin films this heat transmission is the dominant influence factor to the cooling curve of the melt and the residence time provided by the polymer molecules according to the relaxation. Thereby, for example according to the first film property specification preferably a small first negative pressure is adjusted wherein a small heat transmission coefficient is effected. This leads to a slower cooling and a longer relaxation time and therewith to a higher stretchability of the film. In contrast to that for example according to a second film property setting preferably for the first negative pressure a higher negative pressure can be adjusted which leads to a higher heat transmission coefficient and to a faster cooling with a shorter relaxation time and therewith to a lower stretchability of the film. Hereby, higher stretch values of the film can be achieved by adjusting of a particular small negative pressure in the main area. At the same time, the adjustment of a particular high negative pressure in the main area enables that smaller stretchability values of the film can be achieved. Due to the decoupling of the process stability from the film properties by the use of a second negative pressure different from the first negative pressure further the edge area of the film is not negatively influenced. The adjustment for the second negative pressure can thereby be determined likewise by the film property settings or by process parameters. The alterations of the negative pressure being necessary for the process stability in the edge areas do not inadmissibly affect the mechanic properties of the film, vice versa however alterations of the first negative pressure for the generation of the desired film properties do not inadmissibly affect the stability of the edge in the edge area.

It is further possible that in the film machine film material, particularly as continuous material, is led out of the outlet device in form of a melt strip by the transport device. Thereby, particularly the melt strip can be let out with a fixed width and/or the outlet device and/or a nozzle of the outlet device with a fixed melt outlet width (for example width of the nozzle and/or the melt strip) and/or with fixed Deckling-inserts (German: Deckling-Einsätzen). Alternatively or additionally, the nozzle can be configured with continuous or stepwise displaceable Deckling-inserts. This enables a simple adjustment of the second negative pressure in the edge area of the melt strip and a reliable transport of the film material.

Optionally, it can be provided that the main chamber is configured as a first main chamber and particularly a second main chamber is provided. The first and second main chamber together preferably configure a double chamber vacuum box which is expendable by auxiliary chambers. The second main chamber can be arrangeable in relation to (relative to) the first main chamber spaced apart to the melt strip. Thereby, particularly the first main chamber determines how intense the melt strip is sucked to the transport device. The second main chamber possesses particularly primarily the object to reduce the introduced air. In this manner, a suction of the introduced air and a suction of the melt strip can occur particularly effectively and at the same time another negative pressure can be adjusted in the main area (meaning in the net area of the resulting film) compared to the negative pressure in the edge area of the film. The first and second main chamber can for example be separated by a web and/or can be connected with a separately configured flow device respectively. Thereby, preferably the first main chamber and the second main chamber comprise the at least one auxiliary chamber for the generation of a second negative pressure in a second influence area. Alternatively, it is possible that only the first main chamber comprises at least one auxiliary chamber.

Further, it can be provided that the transport device is configured such that after a certain time the film material solidifies on the transport device or before the transport device. The solidified film material can for example be removed from the transport device in a suction place. Alternatively or additionally, it is possible that the film which is produced from a film material or the melt strip is a cast film. Further, it is possible that the device according to the invention is integrated or can be integrated in a cast film machine with which the transport device sucks the film material from the outlet device. Therewith, a flexible use of the device according to the invention is possible.

The transport device can for example be a cast roller or a chill roll. Thereby, the transport device can be preferably configured cylinder-like and can be rotatably mounted particularly about an axis of rotation. Therewith, it can be provided that the transport device rotates during the whole method for the corresponding transport and the cooling of the film material arranged on its surface. The rotation speed of the transport device can thereby be a process parameter which is particularly taken into account for the adjustment of the first and/or second negative pressure. Therewith, film properties and the process stability can be optimized in dependence of the transport device.

Further, it can be provided within the scope of the invention that the main chamber is separated fluidically from the auxiliary chamber, particularly by a sealing element. The sealing element thereby serves particularly as an intermediate sealing in order to separate the first influence area or the main area from the second influence area or the edge area. The sealing element is preferably arranged between the transport device, particularly the cast roller, and the housing of the device, particularly in the area of the main and/or auxiliary chamber opening. The main chamber opening is thereby configured particularly as an air-permeable opening of the main chamber for the air entry and therewith for the negative pressure generation. The auxiliary chamber opening is thereby particularly configured as an air-permeable opening of the auxiliary chamber for the air entry and therewith for the negative pressure generation. The main and/or auxiliary chamber opening is thereby preferably configured in an area of the device or the housing facing the melt strip. The sealing element can preferably extend only in the area of the first main chamber or alternatively in the area of the first main chamber and the second or further main chambers. The sealing element is thereby preferably arranged spaced apart to the lateral area of the device wherein in the outer (most outer) lateral area of the device possibly also end sealings are provided which separate the second influence area or the auxiliary chambers from the outer area of the device. The end sealings thereby preferably enable that the first influence area and/or the second influence area are/is separated from the surrounding of the device. The end sealings can thereby preferably be configured non-adjustable or non-displaceable at the device. Due to the sealing elements or the sealing element particularly the first and second influence areas are separated from one another. This has the advantage that negative pressure can be reliably generated or obtained.

Within the scope of the invention it can be provided that the main chamber and/or the auxiliary chamber are configured and is/are arrangeable at the transport device of the film machine such that the melt strip is suckable to the transport device of the film machine. This enables for example a reliable receipt and a reliable transport of the film material through the transport device. Hereby, the transport device is arranged for example directly adjacent to an outlet device of the film machine in order to accept the flowable film material, meaning particularly the melt strip, in case this exits the outlet device. The main chamber and/or the auxiliary chamber is thereby arranged directly adjacent to the transport device and/or the outlet device such that a suctioning of the melt strip to the transport device is performable. Thereby, it can be provided that the transport device neither contacts the outer device nor the device according to the invention.

Within the scope of the invention it is further possible that the auxiliary chamber is configured and can be arranged at the transport device of the film machine such that a stabilizing of the edge area is performable. Stabilizing means that the edge area or the second influence area comprises a second negative pressure which is adjusted and different from the first negative pressure such that the stability of the film edge is maintained. With a thick edge hereby for example a particularly high negative pressure (second negative pressure which is particularly higher than the first negative pressure) is generated in order to be able to cool the thick edge relatively fast and effective on the transport device. In case of a thin edge thereby particularly a small second negative pressure can be generated particularly smaller than the first negative pressure in order to prevent a folding over of the edge and to increase the process stability.

It is further possible that the device comprises a width extension in width direction which is particularly adjustable to the width of the outlet device of the film machine wherein the main chamber and the at least one auxiliary chamber is arranged adjacently in width direction. Width or width extension thereby is particularly an extension in the width direction wherein the width direction is preferably a direction in which the main chamber is arranged adjacent to the at least one auxiliary chamber. The device is thereby preferably arrangeable at the outlet device and/or transport device such that the width direction proceeds mainly identical to the direction of the axis of rotation of the transport device or parallel hereto and/or the width direction proceeds mainly orthogonal to the transport direction of the film material at the transport device. The width extension is thereby particularly adjusted such that a negative pressure, meaning the first and/or second negative pressure, can be performed along the whole width of the melt strip.

Within the scope of the invention it can be provided that an adjustment mechanism is provided wherein the main chamber and the auxiliary chamber are variably adjustable in its size in width direction. The adjusting mechanism is hereby for example mechanically connected with at least one sealing element. It is further possible that the sealing element is configured as a wall of the device and/or the wall of the housing of the device is configured adjustable. The wall is for example connected fluid tight with the sealing element in order to separate influence areas from one another. The variable adjustment of the size occurs for example by the movement of at least one sealing element which, herefore, is movably mounted for example at the device. Alternatively or additionally, it is possible that the sealing element is configured exchangeable. Thus, the adjusting mechanism can comprise an acceptance of the device according to the invention, particularly a housing of the device according to the invention, which enables a detachable fastening of the at least one sealing element at the device. Thereby, multiple of such acceptances can be provided along the width direction at the device for the sealing elements in order to detachably fix the sealing element at/in these acceptances and therewith arrange it at different positions in width direction at the device. Therewith, a flexible adjustment of the width extension of the main and/or auxiliary chamber is enabled at different process parameters or film properties like for example the width of the edge.

According to a further advantage it can be provided that a sealing element and/or a wall are displaceable for the separation of the main chamber from the auxiliary chamber, particularly manually adjustable and/or slidable configured. The adjustability and/or displaceability occurs for example by an adjusting mechanism which is mechanically connected with the sealing element and/or the wall. The adjustability is for example enabled by an exchangeability and/or by a moveable bearing of the sealing element and/or the wall wherein the adjustment and/or displacement occurs particularly in the direction of the axis of rotation of the transport device. Hereby, it is possible that the width of the second influence area is configured between the end sealing and an intermediate sealing (sealing element) such that the second influence area extends mainly not to the main area of the film. The wall and at least one sealing element can thereby serve for sealing the device according to the invention from all sides to the rotating transport device. It can be further provided that the wall and/or the sealing element comprises for example brushes and/or plastic elements. This can for example be arranged spaced apart to the transport device such that a gap between the transport device and the sealing element and/or the wall results. Alternatively, it is also possible that the sealing element and/or the wall at least partially contact the transport device.

It can further be provided that at least two auxiliary chambers are provided which are particularly arranged in the outer lateral area of the device in width direction wherein between the auxiliary chambers the main chamber is arranged. Further, it is possible that for both auxiliary chambers a differently adjustable or alternatively only one mainly equally adjusted negative pressure is adjustable respectively. Likewise, it is possible that the two auxiliary chambers are configured adjustably different in its width respectively. The two auxiliary chambers thereby particularly serve for generating in a left and in right second influence area the negative pressure for the respective left or right edge area of the melt strip or film respectively. This consequently enables an even more flexible adjustment for the increase of the process stability is possible.

Likewise, it is possible that the dimension of the at least one auxiliary chamber is in width direction configured such that the second influence area of the auxiliary chamber and/or each auxiliary chamber amounts to between 2% to 10% of the whole influence area of the device or the first influence area of the main chamber respectively. It is particularly possible that the influence area of each auxiliary chamber comprises an effective surface respectively which amounts to between 2% to 10% of the effective surface of the whole influence area of the device or the effective surface of the first influence area of the main chamber. The whole influence area is thereby the sum of all first and second influence areas of the device according to the invention. The whole common extension of the main and auxiliary chambers in the width direction corresponds for example to the width extension of the outlet gap or the nozzle of the outlet device. Each auxiliary chamber comprises particularly an extension in width direction respectively which amounts to between 2% to 10%, preferably between 5% and 8% of the whole width extension of the device according to the invention or the main chamber. Therewith, the necessary influence area for the adjustment of the process stability and the properties of the film edge is ensured.

It is further possible that at least one sealing element is configured continuously or stepwise adjustable in width direction in order to variably, particularly completely, separate the respective influence areas between the main chamber and the auxiliary chamber wherein particularly the sealing element is configured fluid tight. The first influence area is for example determined by the distance (in width direction) between the adjacent sealing elements. The second influence area is for example determined by the distance (in width direction) between a sealing element and a hereto adjacent end sealing arranged in the outermost lateral area of the device. The adjustment of the sealing element occurs preferably by a removal and renewed fastening of the sealing element at the device according to the invention, particularly at a wall or at a housing of the device according to the invention. Alternatively or additionally, it is possible that the sealing element is movably arranged at the device according to the invention. Hereby, the influence areas can be flexibly adjusted to certain film properties or process parameters. The sealing element is for example arranged between the housing of the device and the transport device particularly a cast roller.

It is further possible that the sealing element comprises a defined distance to the transport device and is particularly configured contactless to the transport device. Hereby, it is prevented that the sealing element disturbs the rotation of the transport device and therewith the transport of the film material. The distance can for example be in the range of 1 mm to 10 mm, preferably 5 mm to 8 mm. Thereby, the distance is possibly small in order to generate with a particularly small performance effort the necessary negative pressure. The distance can for example be decreaseably or increaseably configured by an exchange of the sealing element which is for example releaseably arranged at the housing particularly by an adjusting mechanism.

Within the scope of the invention it can further be provided that the sealing element is configured adjustably such that a distance between the sealing element and the transport device is variable, wherein hereby particularly the sealing element is configured exchangeably and/or an extension of the sealing element is configured adjustably in the direction of the transport device. In this manner, the device according to the invention can be adjusted for example at different film machines or process parameters. The sealing element is thereby for example movably mounted or detachably arranged at the device in order to enable an exchange of the sealing element with a further sealing element with a higher extension. The adjustment can for example occur automatically by a drive or manually wherein preferably the sealing element is detachably arranged. The adjustable extension of the sealing element is for example realized in that the sealing element itself comprises displaceable elements in order to increase and/or decrease the extension in the direction of the transport device (manually or automatically).

Within the scope of the invention it can further be provided that the sealing element comprises a curved, particularly concave, form adjusted to the transport device at the side facing the melt strip. In this manner, preferably a possibly constant distance between the sealing element and the transport device or the film material transported on the transport device can be achieved.

Within the scope of the invention it can likewise be provided that the sealing element is configured flexibly or elastically deformable, particularly from a flexible or elastically deformable plastic, in order to adjust to the transport device. Alternatively or additionally, it can be possible that the sealing element contacts the transport device. In this case, it is not necessary to provide a defined distance between the transport device and the sealing element wherein for example the assembly is facilitated and the maintaining of the negative pressure is supported.

According to a further advantage within the scope of the invention it can be provided that at least one, particularly first, flow device for the generation of negative pressure is provided in the first influence area and preferably at least a further, particularly a second, flow device for the generation of negative pressure in the second influence area which particularly is operated frequency regulated. The first and/or second flow device can preferably be configured as a blower which is particularly driven frequency regulated. The flow device can for example comprise a frequency deformer or comprise an electronic frequency converter in order to adjust the desired rotations per minute. The first flow device and/or the second flow device can thereby particularly be operated such that an adjustment of the rotations per minute is possible in a defined area. Therewith, the intensity of the first and/or second negative pressure can be varied. Particularly, it is possible that the first and the second flow device are configured separately and/or independently from one another in order to reliably generate two different first and second negative pressures.

In a further advantage at least one air-guided duct element for the flow connection can be arranged with a first flow device and main chamber passage and at least a second air-guided duct element for the flow connection can be connected with a second flow device at an auxiliary chamber passage, spaced apart from the main chamber passage. The main chamber passage and/or the auxiliary chamber passage is thereby particularly configured as an opening in the housing according to the invention or the main- or auxiliary chamber. The first and/or second air-guided duct element is preferably configured as a tube which conducts the air sucked-in by the negative pressure from the corresponding main- and/or auxiliary chamber to the flow device. Hereby, the flow device can be configured and/or arranged spaced apart separately from the main- and/or auxiliary chamber. Therewith, reliably a negative pressure can be generated and a flexible arrangement of the device according to the invention can be ensured. Alternatively, it can be provided that the flow device is arranged or integrated directly at or in the main- and/or auxiliary chamber. The flow device is for example configured as a flow machine particularly a blower or compressor or fan or vacuum pump for the generation of negative pressure. The flow device can for example comprise a motor possibly with an overload protection and/or a frequency converter for the adjustment of the rotations per minute and/or an impellor and/or shovels for the transport of the medium particularly air. Further, the flow device can for example be configured with a suction capacity of 20 to 150,000 $m^3$/h and/or for a generation of negative pressure in a first and/or second influence area and/or within the main- and/or auxiliary chamber from 1 mbar to 900 mbar, preferably 50 mbar to 800 mbar, particularly preferred 100 mbar to 400 mbar.

Advantageously, it can be provided that at least a pressure setting means is provided for the alteration of negative pressure for the main area and/or edge area, wherein preferably only a single flow device is provided for the generation of negative pressure in the first influence area and/or the second influence area and/or a left-sided and/or right-sided second influence area. The or some of the pressure setting means can thereby for example be configured as a throttle or air supply or additional blower/additional flow device. Preferably, in each edge area or in each second influence area the negative pressure is generated by at least one additional flow device respectively or only for each second influence area only by a single flow device. The additional flow devices are preferably frequency-regulated, meaning they comprise particularly variable rotations per minute (by the control device). The pressure setting means thereby preferably serves for balancing the main area and/or the right or left edge of the melt strip or film. It can therefore be meaningful for the right and for the left edge to provide an own pressure setting means with a common flow device respectively, whereby an independently adjustable left-sided or right-sided second influence area or negative pressure is generable. Further, it is possible that for the second influence area and the first influence area pressure setting means are provided respectively, wherein in total for the device according to the invention only one single flow device is used. Hereby, for example the material costs can be reduced. Further, it is possible that for example for each edge area, meaning for example for a first and a second auxiliary chamber, and/or for the main area, meaning for the main chamber, an own flow device and at the same time a pressure setting means is provided respectively. This can, for example, increase the reliability and flexibility when by the flow device and by the pressure setting means the negative pressure is adjustable.

Further, it is possible that at least one sensor device is provided at least partially within the main chamber and/or auxiliary chamber in order to detect the pressure for the main area and/or edge area. The sensor device of the device according to the invention can thereby preferably comprise a sensor element which is for example configured as a pressure sensor. Thereby, the pressure is for example detected in the main area and/or in the edge area preferably in that an indirect measurement occurs for example by pressure measurements in the area of the auxiliary chamber and/or main chamber which are evaluated by the sensor device. The corresponding (actual) value (of the main- and/or auxiliary chamber) can thereby for example be saved as a recipe for the production of the film. Further, it is also possible that a predefined desired value (target value and/or set value) is saved in the recipe and/or is readable from the recipe and is compared to the measured actual value. Hereby, a surveillance of the process stability occurs.

Optionally, it can be provided that a further, second main chamber is provided, wherein particularly the second main chamber is arrangeable with more spaced apart to the melt strip in relation to the main chamber, meaning particularly to the first main chamber, in order to remove air from the transport device. The first main chamber thereby serves particularly for suctioning the melt strip at the transport device and the second main chamber of the introduced air in order to improve the film properties and/or the film stability and/or the (transport) speed.

It is further possible that at least one flow device of the device according to the invention is electrically or wirelessly connected for the regulated variation of the first and/or second negative pressure with a control device of the device according to the invention, wherein particularly the control device comprises a data saving unit for saving of process parameters and/or a control algorithm. The control algorithm can thereby for example be configured as a computer program in order to perform a method according to the invention. In this manner, the process stability and/or film properties can be monitored and/or regulated automatically.

The regulation of the first and/or second negative pressure by the control device occurs, however, for example in dependence of process parameters particularly by a comparison with the values measured by the sensor device. It can be possible that the first and/or second negative pressure is automatically tracked and/or adjusted with alterations of the process parameter like the speed of for example the transport device or during an increase and decrease (German: Hoch- und Runterrampen) of the film machine in order to ensure the best possible stability of the process at any time. Further, it is possible that for achieving of certain process parameters like particularly high flexibility values or small flexibility values of the film in the first influence area particularly small or high negative pressures are adjusted while particularly in the second influence area the negative pressure remains mainly constant. It is further possible that the negative pressure in the main chamber is regulated by a corresponding algorithm such that the film properties are kept constant also with altered process- or environmental conditions. Particularly advantageous here is the decoupling of the film properties and the process stability as a basic condition for the feasibility of such a regulation.

Likewise, subject matter of the invention is a method for the production of a film particularly a plastic film. Hereby, particularly film material is guided from an outlet device in form of a melt strip through a transport device. Thereby, preferably by at least one main chamber a first negative pressure is generated in a first influence area and by at least one auxiliary chamber a second negative pressure is generated in a second influence area. The first influence area is thereby assigned to at least one main area of the melt strip and/or the film and the second influence area is assigned to at least to an edge area of the melt strip and/or the film adjacent to the main area. Particularly, the first edge area and the second edge area are provided and arranged adjacent to the main area, wherein the first and second edge area are arranged on opposing sides of the main area respectively. The first negative pressure differs from the second negative pressure, wherein a stabilization of the melt strip is effected. The first negative pressure in the first influence area is thereby generated particularly indirectly by the main chamber and the second negative pressure in the second influence area is particularly generated indirectly by the auxiliary chamber in that the main chamber is connected with the first flow device and the auxiliary chamber with the second flow device. Further, it can be provided that the film material cools down or solidifies on or before the transport device. The method according to the invention provides the same advantages like they have been described in detail in relation to the device according to the invention. Further, the method according to the invention can be suitable to operate a device according to the invention.

Within the scope of the invention it is likewise possible that a dimension of the main chamber and/or auxiliary chamber in width direction is adjusted continuously or in steps to the outlet device of the film machine. Preferably by an adjustment of the auxiliary chamber due to the adjacent arrangement of the auxiliary chamber to the main chamber and the particularly fixed extension of the device in width direction likewise the dimension of the main chamber in width direction is adjusted continuously or stepwise to the outlet device of the film machine and thereby also to the main- or edge area of the melt strip or the film. The extension of the device in width direction thereby relates preferably (mainly) to the sum of the dimensions of all main- and auxiliary chambers in width direction. The adjustment occurs preferably such that the first and second influence area extends along the whole width of the melt strip and the second influence area extends particularly to the edge area and the first influence area extends particularly to the main area of the melt strip or the film. Hereby, likewise, an adjustment of process parameters is possible.

Further, it can be provided that a dimension of the main chamber and/or auxiliary chamber in width direction and/or the intensity of the second negative pressure is adjusted automatically to process parameters. This automatic adjustment occurs for example by a control device which for example is connected for the adjustment of the intensity with at least one flow device or for the adjustment of the dimensions of the main- and/or auxiliary chamber in width direction for example with a drive unit for displacement of at least one sealing element. The process parameter thereby can for example relate to a rotation speed of the transport device, pre-saved recipes, the desired film thickness, the film characteristic, the film and/or edge area and/or main area width and/or the arrangement of the device according to the invention at the melt strip. The adjustment enables, for example, in case of an increase and decrease (of the film machine) at any time the best possible stability of the process is ensured.

It can further be provided that the second negative pressure and/or the first negative pressure are independent from one another, particularly adjusted to the process parameter. Thereby, it can be provided that the first negative pressure is always smaller than the second negative pressure or vice versa. Further, it can be possible that the first negative pressure and the second negative pressure are adjustable such that they differ about at least 5 mbar and/or at least 10 mbar and/or at least 100 mbar and/or at least 200 mbar from one another.

For the adjustment a control device with a first flow device for a first negative pressure can for example be connected with a second flow device for a second negative pressure.

According to a preferred embodiment of the invention it can be provided that the film generated by the method comprises a thickness of maximum 15 μm, preferably maximum 12 μm, particularly preferred maximum 10 μm and/or is in the area of 1 μm to 17 μm, preferably 8 μm to 15 μm. In case of such film thicknesses the independent adjustment of the process stability and the film properties, meaning the independent adjustability of the first and second negative pressure are particularly meaningful. The method according to the invention thereby permits a high speed production, particularly of preferably thin or preferably high or low stretchable films, particularly as a continuous material.

It can be preferably provided that the first negative pressure and/or the second negative pressure can be varied particularly automatically and/or regulated particularly independent from one another particularly in dependence of process parameters. Hereby, for example the control device can be used for regulating particularly by a regulating algorithm. The process parameter can thereby for example be read out from a non-volatile data safety unit of the control device. With the regulation of the first and/or second negative pressure for example and actual value is compared with a target value which is detected at a measured value from a sensor device and the actual value is adjusted or regulated by the control of the flow device to the target value (meaning for example the negative pressure).

Likewise protected is a film machine for the production of film, particularly plastic film, particularly a cast film machine particularly for the production of a stretch film (particularly in the cast film method). Thereby, it is preferably provided that the film machine comprises a transport device for the transport of film material and an outlet device. Thereby, the film material is let out or can be let out from the outlet device in form of a melt strip by the transport device. Hereby, it is particularly provided that at least one main chamber is provided for the generation of a first negative pressure in a first influence area and at least one auxiliary chamber for the generation of a second negative pressure in a second influence area, wherein the first influence area is assigned to at least one main area of the melt strip and the second influence area to at least one edge area of the melt strip adjacent to the main area and wherein the first negative pressure differs from the second negative pressure in order to effect a stabilization of the melt strip. Hereby, the same advantages result like they have been described in detail in relation to the method according to the invention and/or the device according to the invention. Further, it is possible that the film machine according to the invention comprises a device according to the invention for the generation of negative pressure and/or is operable according to a method according to the invention.

Further protected is a system comprising a device according to the invention with an outlet device and/or with a transport device.

Further advantages, features and details of the invention result from the subsequent description in which embodiments of the invention are described in detail in relation to the drawings. Thereby, the features described in the claims and in the description can be essential for the invention each single by themselves or in any combination. It is shown:

In the subsequent figures for the same technical features even in different embodiments the same reference signs are used.

Figure 1:
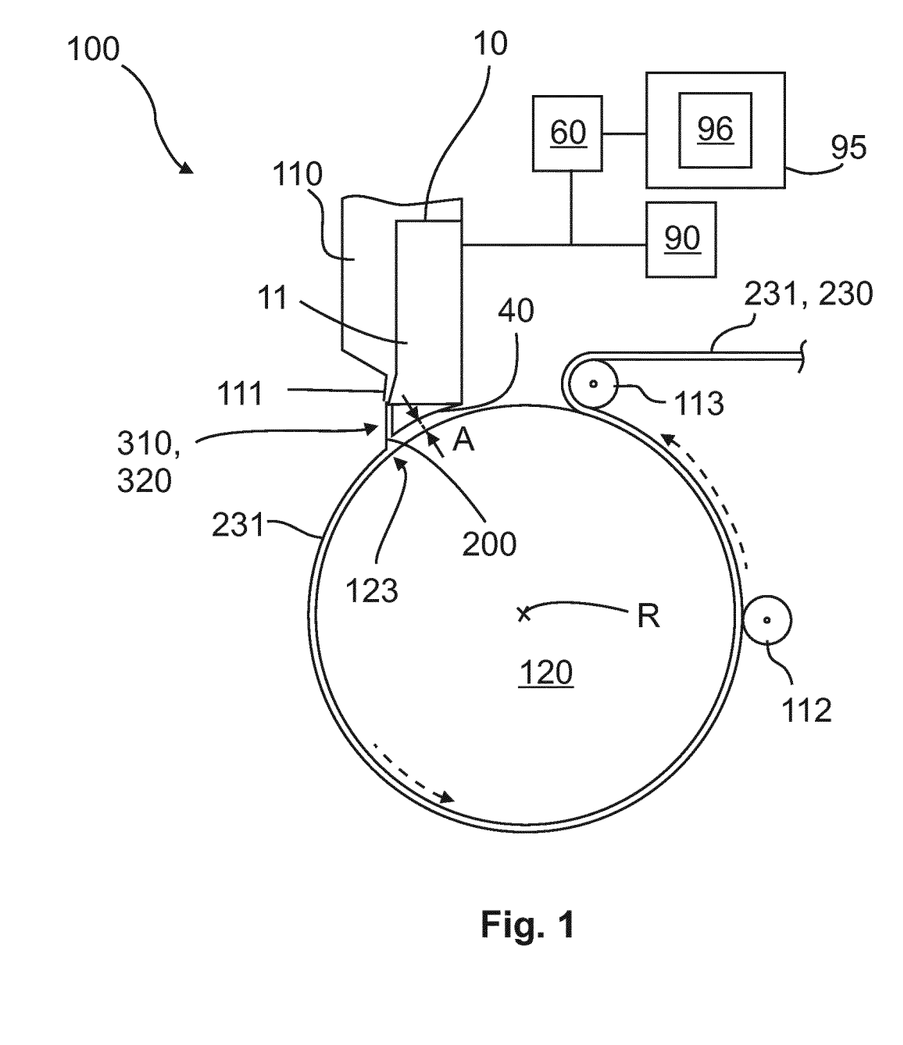
FIG. 1 a schematic lateral view of a device according to the invention and a film machine according to the invention, FIG. 2 a schematic front view of a device according to the invention, FIG. 3 a schematic front view of a device according to the invention, FIG. 4 a further schematic front view of a device according to the invention, FIG. 5 a schematic lateral view of a device according to the invention, FIG. 6 a schematic rear view of a device according to the invention, FIG. 7 a further schematic rear view of a device according to the invention, FIG. 8 a further schematic rear view of a device according to the invention, FIG. 9 a schematic representation for visualizing a method according to the invention.

In FIG. 1 a device 10 according to the invention is shown in schematic lateral view. The device 10 according to the invention is hereby integrated into a film machine 100 according to the invention, wherein in FIG. 1 only parts of this film machine 100 are schematically shown. The film machine 100 according to the invention, for example a cast film machine, comprises a transport device 120. The transport device 120 is for example a chill roll 120. Via an outlet device 110 which is for example located upstream of one or multiple extruder devices a flowable film material 231 is arranged in form of a melt strip 200 above the outlet gap 111 particularly a nozzle 111 on the surface of the transport device 120. The transport device 120 can herefore be for example configured cooled in order to effect a cooling or solidifying of the film material 231 at or before the transport device 120. For the transport of the film material 231 the transport device 120 rotates about an axis of rotation R in direction of the dotted arrows shown in FIG. 1. The film material 231 is further transported into the direction of the dotted arrows after the acceptance by the transport device 120 at a receiving location 123. Moreover, at the transport device 120 further rolls 112, 113 are arranged which can be for example configured as detaching rollers and/or cleaning rollers. The film material 231 leaves the film machine 100 according to the invention as a film 230. The arrangement shown in FIG. 1, particularly the outlet device 110 and/or the device 10 according to the invention at the transport device 120, is thereby exemplary and can further vary. Thus, the outlet device 110 can be arranged offset with a device 10 according to the invention for example further in a depth direction T in the direction of the roller 113 like shown in FIG. 5.

In the area of the outlet device 110 according to FIG. 1 further the device 10 according to the invention is arranged for the generation of a negative pressure for the melt strip 200. The device 10 comprises for example a housing 11 and is releasably or detachably connected with the outlet device 110. Alternatively, it is possible that the device 10 according to the invention is configured independently as a separate component possibly spaced apart to the outlet device 110 possibly arranged at the transport device 120.

For the generation of a first and second negative pressure the device 10 according to the invention is connected with a flow device 60, wherein the flow device 60 can be configured separately from the device 10 or can be integrated into the device 10. The flow device 60 is for example configured as a frequency regulated blower 60 and is controlled and/or regulated preferably by a control device 95. Hereby, for example the rotations per minute of the flow device 60 and therewith the intensity of the generated negative pressure can be adjusted. Further, preferably a sensor device 90 is arranged at the device 10 according to the invention in order to measure the generated negative pressure by the flow device 60. The measured values can for example be at least cached in a data storage unit 96 of the control device 95. The comparison of the measured values of the generated negative pressure (actual value) with the desired value of the negative pressure intensity (target value) by the control device 95 therewith enables that a control circuit can be provided consisting of at least the control device 95 and the sensor device 90 for controlling the flow device 60.

In order to generate a first negative pressure separately from a second negative pressure a corresponding first influence area 310 has to be fluidically separated from a second influence area 320. Herefore, at least one sealing element 40 serves which is arranged in the area of the first influence area 310 and/or the second influence area 320.

Figure 2:
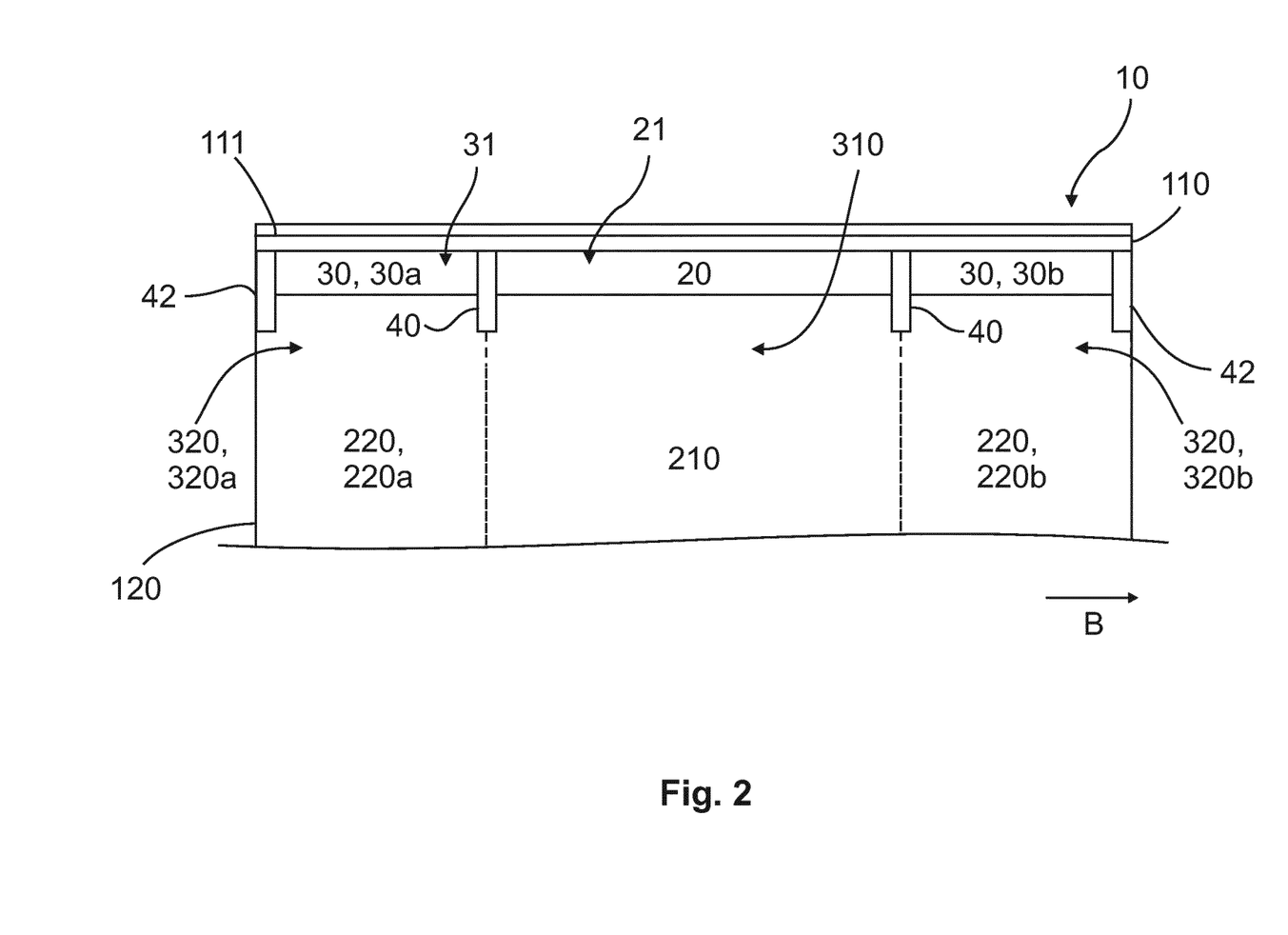

In FIG. 2 a front view of a device 10 according to the invention is shown. Thereby, it can be recognized that the device 10 comprises different chambers adjacently adjoiningly in width direction B, meaning at least one main chamber 20 and at least one auxiliary chamber 30 for different influence areas 310, 320. The auxiliary chambers 30, particularly a first auxiliary chamber 30*a* and a second auxiliary chamber 30*b*, thereby generate a second negative pressure or different second negative pressures in the respective second influence area 320 respectively. The first auxiliary chamber 30*a* is thereby assigned to particularly a left sided second influence area 320*a* and the second auxiliary chamber 30*b* to a right sided second influence area 320*b*. The influence area thereby determines in which area the film 230 or the melt strip 200 the corresponding negative pressure is applied. Thus, a first negative pressure in the first influence area 310 is applied for a main area 210 of the melt strip 200 or the film 230. A second negative pressure is applied in a second influence area 320 for an edge region 220 of the melt strip 200 or the film 230. Thereby, preferably in a left-sided second influence area 320 the second negative pressure for a first edge area 220*a* is generated and in the right-sided second influence area 320*b* the second negative pressure for a second edge area 220*b* of the melt strip 200 or the film 230 is generated. The respective second negative pressures can thereby be identical or differ from one another. For the generation of the negative pressure the main chamber 20 comprises preferably a main chamber opening 21 directed to the transport device 120 and/or the melt strip 200 and the auxiliary chamber 30 comprises an auxiliary chamber opening 31 directed to the transport device 120 and/or melt strip 200. The main chamber opening 21 and/or the auxiliary chamber opening 31 are preferably arrangeable behind the melt strip 200, particularly underneath the corresponding outlet device 110 or the outlet gap 111 like shown in FIG. 2.

In order to separate the first and second influence area 310, 320 from one another at least one sealing element 40 is provided. The sealing element 40 is arranged spaced apart to the transport device 120 with a distance A shown in FIG. 1 in order to prevent a contact with the surface of the transport device 120. Alternatively, it is possible that the sealing element 40 is configured flexible and/or elastically such that a contact with the surface of the transport device 120 is possible without causing a damage. For the lateral separation of the second influence areas 320 or auxiliary chambers 30 to the outer environment of the device 10 according to the invention further end seals 42 are provided. In contrast to the end seals 42 all sealing elements 40 are arranged preferably between the main chamber 20 and one of the auxiliary chambers 30 or between the first influence area 310 and at least one of the second influence areas 320.

Figure 3:
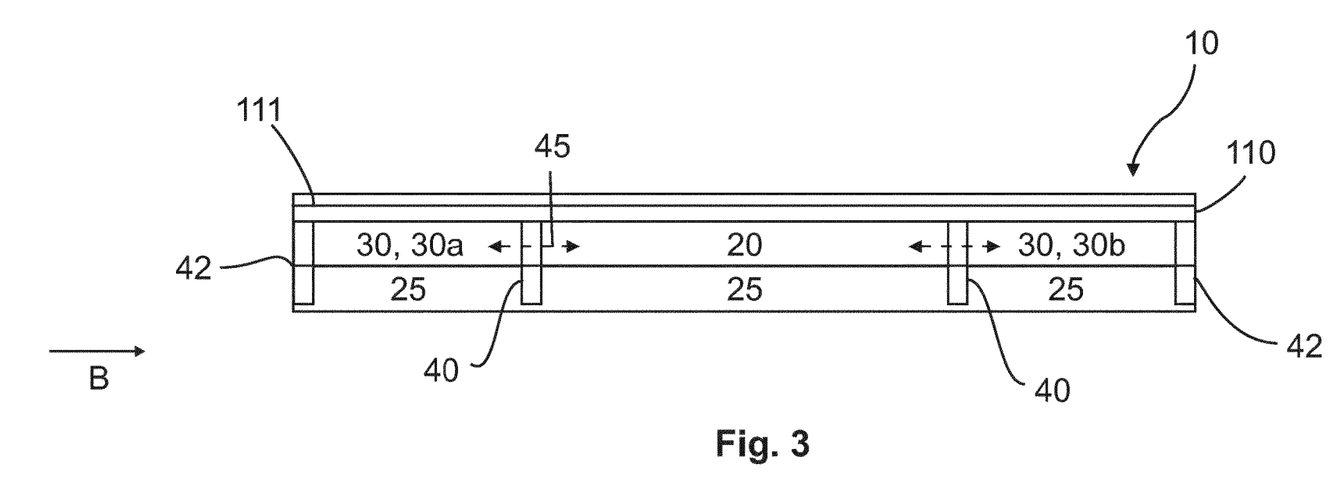
Figure 4:
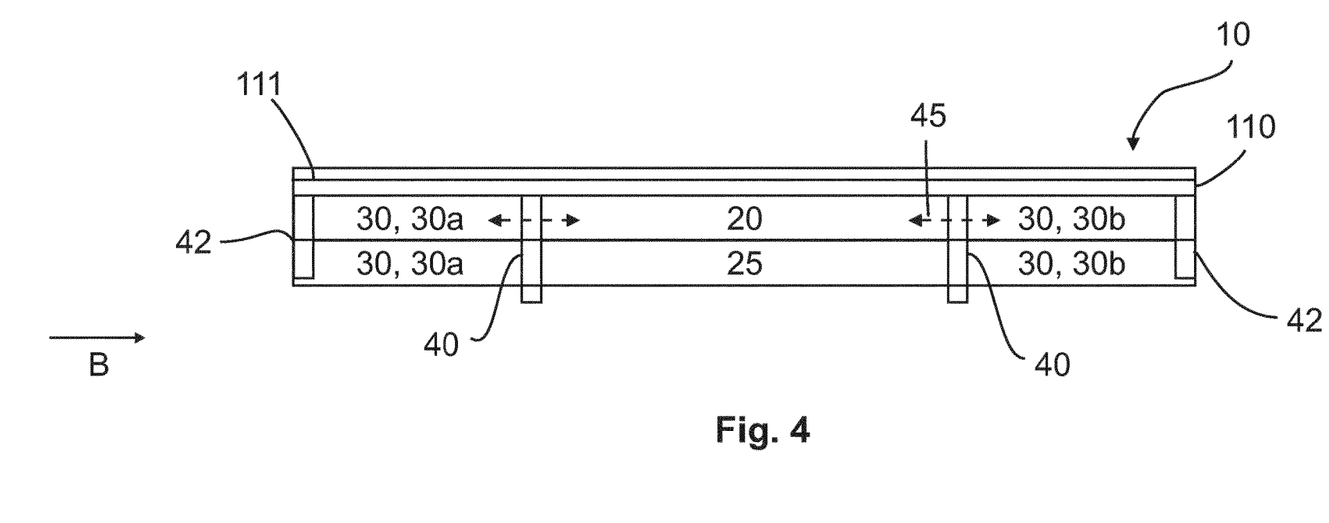

In FIGS. 3 and 4 further frontal views of a device 10 according to the invention are schematically shown. Thereby, the device 10 according to the invention can comprise one or multiple second main chambers 25 beneath a (first) main chamber 20. Thereby, the second main chamber 25 can extend underneath the first main chamber 20 (which is closer in the direction of the transport device 120). Further, the second main chamber 25 can be arranged offset from the first main chamber 20 for example in direction of the depth direction T shown by an arrow in FIG. 5 (in opposing direction to the melt strip 200 or the outlet device 110). Therewith the interaction of the first and second main chamber 20, 25 enables that the melt strip 200 can be optimally sucked and at the same time the introduced air can be reduced.

For the adjustment an alteration of the first and second influence areas 310, 320 the at least one sealing element 40 can be configured adjustable like shown in FIGS. 3 and 4 by dotted arrows. Herefore, for example an adjusting mechanism 45 is provided which for example comprises a moveable bearing of the sealing elements 40 at the device 10 according to the invention. Further, the adjusting mechanism 45 can comprise an acceptance of the device 10 according to the invention particularly of a housing 11 of the device 10, which enables a removable arrangement of the at least one sealing element 40 at the device 10. Thereby, multiple of such acceptances can be provided along the width direction B of the device 10 in order to arrange the sealing element 40 in different positions in width direction B at the device 10. Therewith, the extension of the first influence area 310 and/or the second influence area 320 in width direction B can be varied. Thereby, it is possible that the sealing element 40 according to FIG. 3 extends or is connected only in the area of the (first) main chamber 20 or according to FIG. 4 likewise in the second main chamber 25. Therewith, according to FIG. 4 further second influence areas 320 or auxiliary chambers 30 can be configured for the second main chamber 25. In comparison to the second main chamber 25 according to FIG. 3 does not comprise adjacent auxiliary chambers 30 and therewith also no adjacent first influence areas 310.

Figure 5:
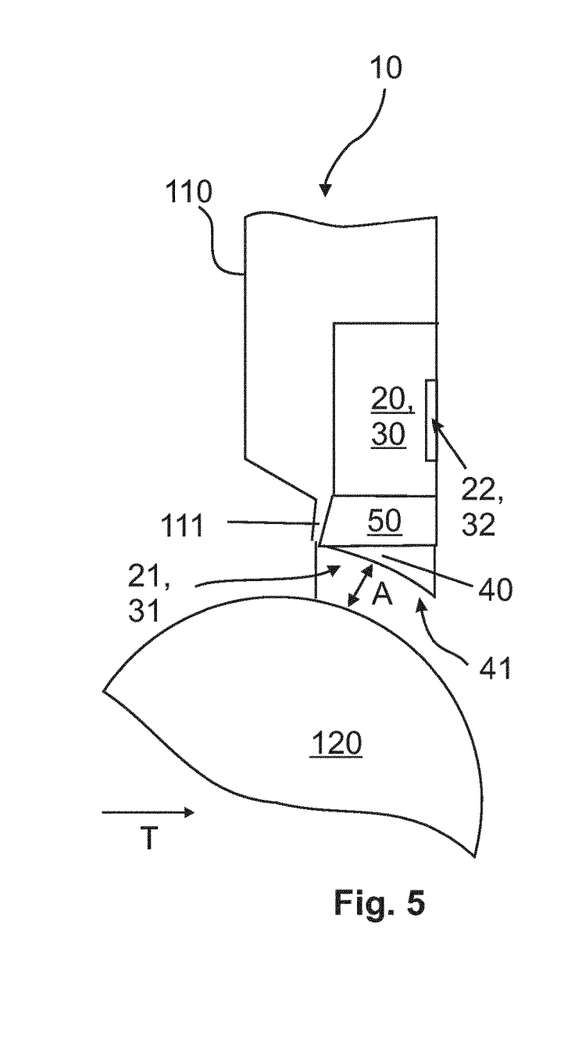

In FIG. 5 a further lateral view to a device 10 according to the invention is shown, wherein a wall 50 is shown in the area of the main chamber 20 and/or the auxiliary chamber 30. The wall 50 thereby configures preferably at least a part of the housing 11. The wall 50 can thereby be particularly be arranged aligned towards the sealing element 40 in order to along with the sealing element 40 separate the first influence area 310 from the second influence area 320 particularly fluidically. Likewise, it is possible that the wall 50 and the sealing element 40 are configured adjustably and/or displaceably and/or exchangeably by the adjusting mechanism 45. Further, it is shown in FIG. 5 that the sealing element 40 comprises a curve 41 in order to be adjusted to the form of the surface of the transport device 120. The main chamber 20 or the auxiliary chamber 30 further comprise a corresponding main chamber passage 22 or auxiliary chamber passage 32 in order to connect the main chamber 20 or the auxiliary chamber 30 with the flow device 60.

Figure 6:
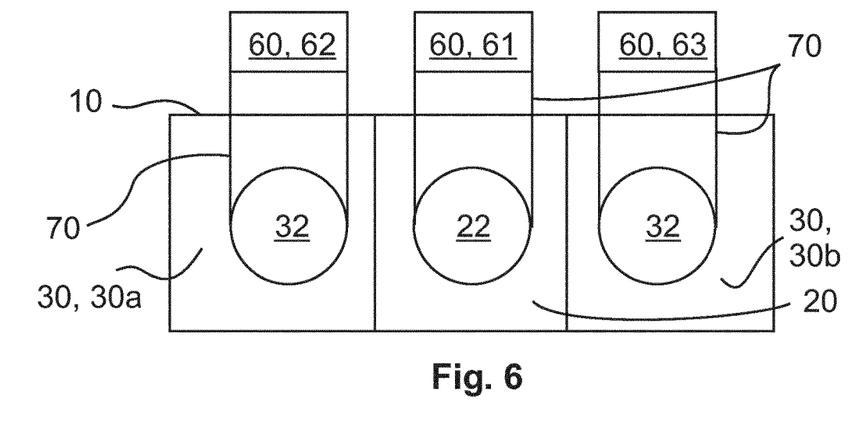
Figure 7:
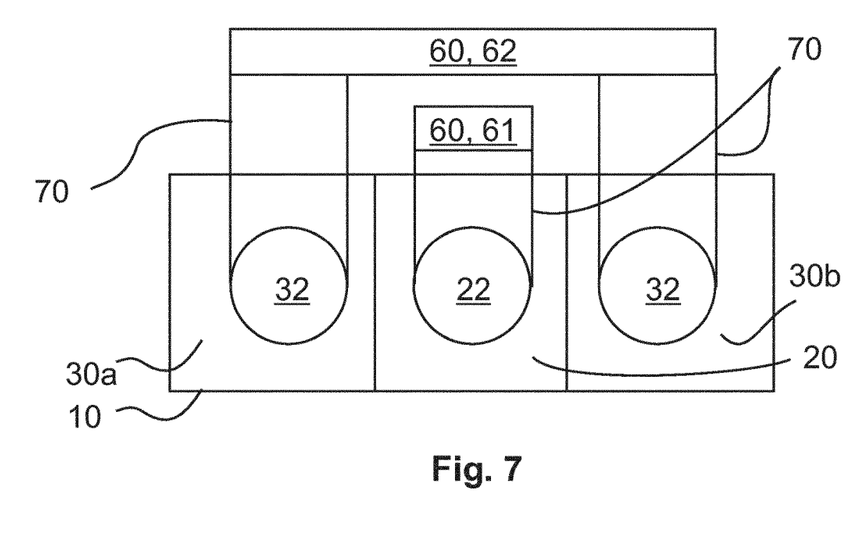
Figure 8:
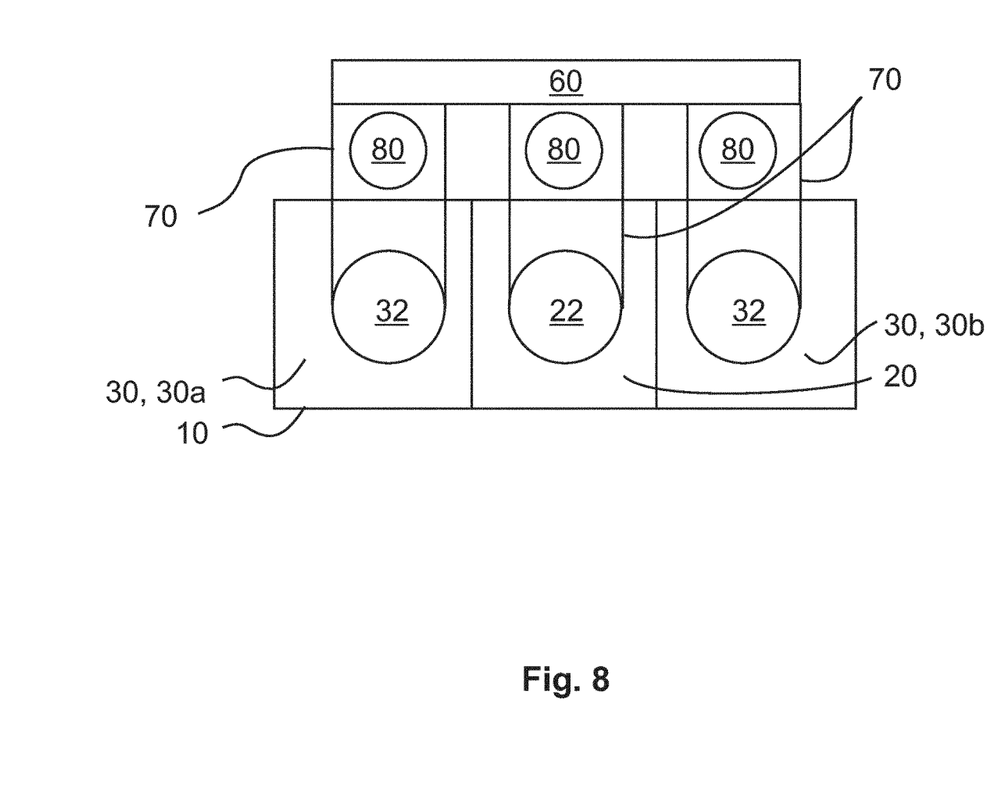

In FIGS. 6 to 8 the connection of the main chamber 20 and the at least one auxiliary chamber 30 is shown with corresponding flow devices 60. Since the flow device 60, for example as a blower 60, generates the negative pressure in the main chamber 20 and/or the auxiliary chamber 30 of the device 10 according to the invention the chambers need to be connected by duct elements 70 with the flow device 60. The duct elements 70, which can for example be configured as air-guiding tubes 70, can hereby for example be arranged at a main chamber passage 22 of the main chamber 20 or an auxiliary chamber passage 32 of the auxiliary chamber 30. For the improved air conduction for example a sealing in the area of the main chamber passage 22 and/or the auxiliary chamber passage 32 is provided.

In FIG. 6 it is shown that each main chamber 20 and each auxiliary chamber 30 can be connected with different flow devices 60 respectively in order to generate different negative pressures in the respective influence area. Thus, a first flow device 61 can generate a first negative pressure for the main chamber 20, a second flow device 62 a second negative pressure for a first auxiliary chamber 30a and a third flow device 63 a further second negative pressure for a second auxiliary chamber 30b. Alternatively, it is possible that according to FIG. 7 only one second flow device 62 generates a second negative pressure for the first auxiliary chamber 30a and also for the second auxiliary chamber 30b. According to FIG. 8 a single flow device 60 can be provided for all chambers, meaning for the main chamber 20 and for the auxiliary chambers 30. In this case a different negative pressure can be generated for example by a pressure setting means 80, like for example throttles.

Figure 9:
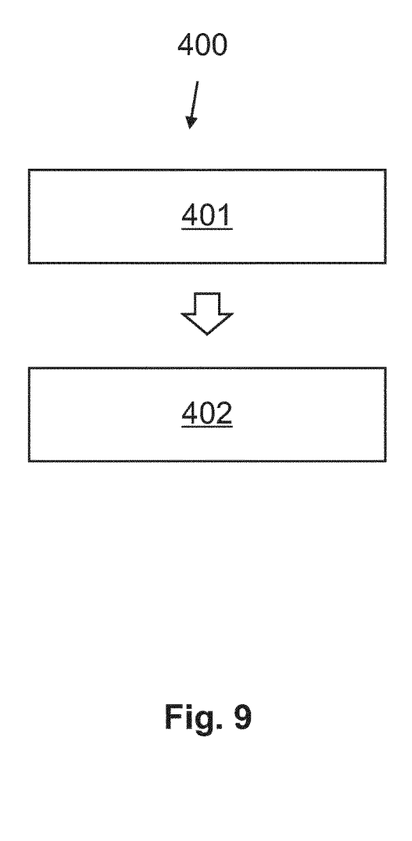

In FIG. 9 a method 400 according to the invention is schematically visualized. Thereby, according to a first method step 401 by at least one main chamber 20 a first negative pressure and a first influence area 310 is generated. According to a second method step 402 by at least one auxiliary chamber 30 a second negative pressure is generated in a second influence area 320.

The previous description of the embodiments describes the present invention only within the scope of examples. Single features of the embodiments, as far as technically meaningful, can naturally be freely combined with another without leaving the scope of the present invention.

REFERENCE LIST 10 device
11 housing
20 main chamber
21 main chamber opening
22 main chamber passage
25 second main chamber
30 auxiliary chamber
30a first auxiliary chamber
30b second auxiliary chamber
31 auxiliary chamber opening
32 auxiliary chamber passage
40 sealing element
41 curve
42 end seal
45 adjusting mechanism
50 wall
60 flow device
61 first flow device
62 second flow device
63 third flow device
70 duct element
80 pressure setting means
90 sensor device
95 control device
96 data storage unit
100 film machine
110 outlet device
111 outlet gap/nozzle
112 roller/cleaning roller
113 roller/detaching roller
120 transport device
123 receiving location
200 melt strip
210 main area
220a first edge area
220b second edge area
230 plastic film
231 film material
310 first influence area
320 second influence area
320a left-sided second influence area
320b right-sided second influence area
400 method
401 first method step
402 second method step
B width direction
T depth direction
A distance
R axis

The invention claimed is:

1. A device for the generation of a negative pressure for stabilizing a melt strip in the area of a transport of a film machine comprising:
at least one main chamber for generating a first negative pressure in a first influence area, and
at least one auxiliary chamber for generating a second negative pressure in a second influence area, wherein the first influence area is assignable to at least one main area of the melt strip and the second influence area is assignable to at least one edge area of the melt strip adjacent to the main area, and wherein the first negative pressure differs from the second negative pressure in order to effect a stabilization of the melt strip, at least the first negative pressure or the second negative pressure are at least automatically or controllably varied, extensions of the at least one auxiliary chamber in a width direction are configured in such a way that the second influence area of the auxiliary chamber amounts to between 2% to 10% of a whole influence area of the device or of the first influence area of the main chamber, and at least a sealing element or a wall are configured adjustably for the separation of the main chamber from the auxiliary chamber, wherein the sealing element comprises a curved form adjusted to the transport at the side facing the melt strip.

2. The device according to claim 1, wherein the main chamber is separated fluidically from the auxiliary chamber.

3. The device according to claim 1, wherein at least the main chamber or the auxiliary chamber are configured and arrangeable to the transport of the film machine such that the melt strip is suckable to the transport of the film machine.

4. The device according to claim 1, wherein the auxiliary chamber is configured and arrangeable to the transport of the film machine such that the stabilization of the edge area is performable.

5. The device according to claim 1, wherein the device comprises a width extension in the width direction which is adjustable to a width of an outlet device of the film machine, wherein the main chamber and the at least one auxiliary chamber are adjacently arranged in the width direction.

6. The device according to claim 1, wherein an adjusting mechanism is provided wherein the main chamber and the auxiliary chamber are variably adjustable in their size in the width direction.

7. The device according to claim 1, wherein at least two auxiliary chambers are provided which are arranged in an outer lateral area of the device in the width direction, wherein between the auxiliary chambers the main chamber is arranged.

8. The device according to claim 1, wherein at least one sealing element is configured continuously or stepwise adjustable in the width direction in order to variably separate the respective influence areas between the main chamber and the auxiliary chamber.

9. The device according to claim 1, wherein the sealing element comprises a defined distance to the transport.

10. The device according to claim 1, wherein the sealing element is configured adjustably such that a distance is variable between the sealing element and the transport.

11. The device according to claim 1, wherein the sealing element is configured at least flexible or elastically deformable in order to adjust to the transport.

12. The device according to claim 1, wherein the sealing element contacts to the transport.

13. The device according to claim 1, wherein at least one flow generator is provided for the negative pressure generation at least in the first influence area or in the second influence area.

14. The device according to claim 13, wherein at least one pressure setter is provided for the alteration of negative pressure for at least the main area or the edge area, wherein preferably only one flow generator is provided for the generation of negative pressure in the first influence area and in the second influence area.

15. The device according to claim 13, wherein at least one flow generator for the controlled variation of the first and/or second negative pressure is electrically or wirelessly connected to a control device.

16. The device according to claim 1, wherein at least one first air-conveying duct element for the flow connection with a first flow device is arranged at a main chamber passage and at least a second air-conveying duct element for the flow connection with a second flow device is arranged at an auxiliary chamber passage spaced apart from the main chamber passage.

17. The device according to claim 1, wherein at least one sensor is provided at least within the main chamber or auxiliary chamber in order to detect the pressure for the main area or edge area.

18. The device according to claim 1, wherein a further second main chamber is provided.

19. The device according to claim 18, wherein the second main chamber is arrangeable in relation to the main chamber more spaced apart to the melt strip in order to remove air at the transport.

20. A film machine for the production of a plastic film, wherein the film machine comprises a transport for transporting film material and an outlet device, wherein the film material is guidable out of the outlet device in form of a melt strip through the transport wherein at least one main chamber is provided for the generation of a first negative pressure in a first influence area and at least one auxiliary chamber for the generation of a second negative pressure in a second influence area wherein the first influence area is assignable to at least one main area of the melt strip and the second influence area to at least one edge area of the melt strip adjacent to the main area and wherein the first negative pressure differs from the second negative pressure in order to effect a stabilization of the melt strip, and wherein at least the first negative pressure or the second negative pressure are at least automatically or controllably varied, extensions of the at least one auxiliary chamber in a width direction are configured in such a way that the second influence area of the auxiliary chamber amounts to between 2% to 10% of a whole influence area or of the first influence area of the main chamber, and at least a sealing element or a wall are configured adjustably for the separation of the main chamber from the auxiliary chamber, wherein the sealing element comprises a curved form adjusted to the transport at the side facing the melt strip.

21. The film machine according to claim 20, wherein a device is provided for the generation of a negative pressure for stabilizing a melt strip in the area of a transport of the film machine, the device comprising:

at least one main chamber for generating a first negative pressure in a first influence area, and at least one auxiliary chamber for generating a second negative pressure in a second influence area, wherein the first influence area is assignable to at least one main area of the melt strip and the second influence area is assignable to at least one edge area of the melt strip adjacent to the main area, and wherein the first negative pressure differs from the second negative pressure in order to effect a stabilization of the melt strip.

22. A device for the generation of a negative pressure for stabilizing a melt strip in the area of a transport of a film machine comprising:
    at least one main chamber for generating a first negative pressure in a first influence area, and
    at least one auxiliary chamber for generating a second negative pressure in a second influence area, wherein
    the first influence area is assignable to at least one main area of the melt strip and the second influence area is assignable to at least one edge area of the melt strip adjacent to the main area, and
    wherein
    the first negative pressure differs from the second negative pressure in order to effect a stabilization of the melt strip,
    at least the first negative pressure or the second negative pressure are at least automatically or controllably varied,
    the main chamber is separated fluidically from the auxiliary chamber,
    at least a sealing element or a wall are configured adjustably for the separation of the main chamber from the auxiliary chamber, wherein the sealing element comprises a curved form adjusted to the transport at the side facing the melt strip, and
    the sealing element contacts to the transport.

23. A method for the production of a film, wherein the film material is guided out of an outlet device in form of a melt strip through a transport, and by at least one main chamber a first negative pressure is generated in a first influence area and by at least one auxiliary chamber a second negative pressure is generated in a second influence area, wherein the first influence area is assigned to at least one main area of the melt strip and the second influence area to at least one edge area of the melt strip adjacent to the main area and wherein the first negative pressure differs from the second negative pressure, whereby a stabilization of the melt strip is effected, and
    wherein
    at least the first negative pressure or the second negative pressure are at least automatically or controllably varied,
    extensions of the at least one auxiliary chamber in a width direction are configured in such a way that the second influence area of the auxiliary chamber amounts to between 2% to 10% of a whole influence area or of the first influence area of the main chamber, and
    at least a sealing element or a wall are configured adjustably for the separation of the main chamber from the auxiliary chamber, wherein the sealing element comprises a curved form adjusted to the transport at the side facing the melt strip.

24. The method according to claim 23, wherein a dimension of the auxiliary chamber in the width direction is continuously or stepwise adjustably adapted to the outlet device of the film machine.

25. The method according to claim 23, wherein a dimension of the auxiliary chamber at least in the width direction or the intensity of the second negative pressure are automatically adjusted to process parameters.

26. The method according to claim 23, wherein at least the second negative pressure or the first negative pressure are independently from one another adjusted to process parameters.

27. The method according to claim 23, wherein the film generated by the method comprises a thickness of maximum 15 µm, preferably maximum 12 µm.

28. The method according to claim 23, wherein at least the first negative pressure or the second negative pressure are at least automatically or controllably varied independently from one another.

29. The method according to claim 23, wherein a device is operated according to claim 1.

* * * * *